(12) United States Patent
Ferfecki et al.

(10) Patent No.: US 11,971,009 B2
(45) Date of Patent: Apr. 30, 2024

(54) MANUFACTURING A WIND TURBINE BLADE SHELL PART

(71) Applicant: LM WIND POWER A/S, Kolding (DK)

(72) Inventors: Artur Ferfecki, Kolding (DK); Lars Nielsen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 245 days.

(21) Appl. No.: 17/439,873

(22) PCT Filed: Mar. 13, 2020

(86) PCT No.: PCT/EP2020/056802
§ 371 (c)(1),
(2) Date: Sep. 16, 2021

(87) PCT Pub. No.: WO2020/187730
PCT Pub. Date: Sep. 24, 2020

(65) Prior Publication Data
US 2022/0186707 A1 Jun. 16, 2022

(30) Foreign Application Priority Data
Mar. 21, 2019 (EP) .................................... 19164310

(51) Int. Cl.
*F03D 1/06* (2006.01)
*B29C 70/34* (2006.01)
(Continued)

(52) U.S. Cl.
CPC .......... *F03D 1/0675* (2013.01); *B29C 70/345* (2013.01); *B29C 70/54* (2013.01);
(Continued)

(58) Field of Classification Search
CPC ...... F03D 1/0675; F03D 1/065; F03D 1/0658; F03D 13/10; F03D 13/20; B29C 70/345;
(Continued)

(56) References Cited

U.S. PATENT DOCUMENTS

2004/0050384 A1* 3/2004 Stein ........................ A62C 3/00
128/200.23
2014/0001682 A1* 1/2014 Schneiderbauer .... B29C 70/443
264/571

(Continued)

FOREIGN PATENT DOCUMENTS

DE 102015007977 A1 12/2016
EP 3345751 A1 7/2018
(Continued)

*Primary Examiner* — Mickey H France
(74) *Attorney, Agent, or Firm* — Nath, Goldberg & Meyer; Jerald L. Meyer; Tanya E. Harkins

(57) ABSTRACT

The present invention relates to a method for manufacturing a wind turbine blade shell part made of a fibre-reinforced composite structure, including steps of mounting a plurality of fastening devices on a mounting plate to form a root end assembly, the mounting plate comprising one or more first openings for evacuating air; arranging the root end assembly over a mould surface of a mould; arranging an air-tight cover member so as to form a mould cavity; evacuating air from the mould cavity via at least the one or more first openings of the mounting plate; and supplying a polymer into the mould cavity and allowing the polymer to cure so as to form the composite structure. A root end assembly for use in the method is also provided.

15 Claims, 8 Drawing Sheets

(51) Int. Cl.
  *B29C 70/54*     (2006.01)
  *B29L 31/08*     (2006.01)
(52) U.S. Cl.
  CPC ..... *B29L 2031/085* (2013.01); *F05B 2230/20* (2013.01); *F05B 2280/6003* (2013.01)
(58) Field of Classification Search
  CPC ..... B29C 70/54; B29C 70/443; B29C 70/548; B29C 70/72; B29C 70/86; B29L 2031/085; F05B 2230/20; F05B 2280/6003; B29D 99/0028
  See application file for complete search history.

(56) References Cited

U.S. PATENT DOCUMENTS

| | | | |
|---|---|---|---|
| 2015/0224721 A1* | 8/2015 | Bendel | B29C 70/443 264/553 |
| 2019/0283347 A1* | 9/2019 | Walker | B29C 70/76 |

FOREIGN PATENT DOCUMENTS

| | | | | |
|---|---|---|---|---|
| WO | WO-2014191046 A1 * | 12/2014 | | B29C 33/12 |
| WO | 2018121824 A1 | 7/2018 | | |
| WO | 2019178476 A1 | 9/2019 | | |

* cited by examiner

Fig. 8
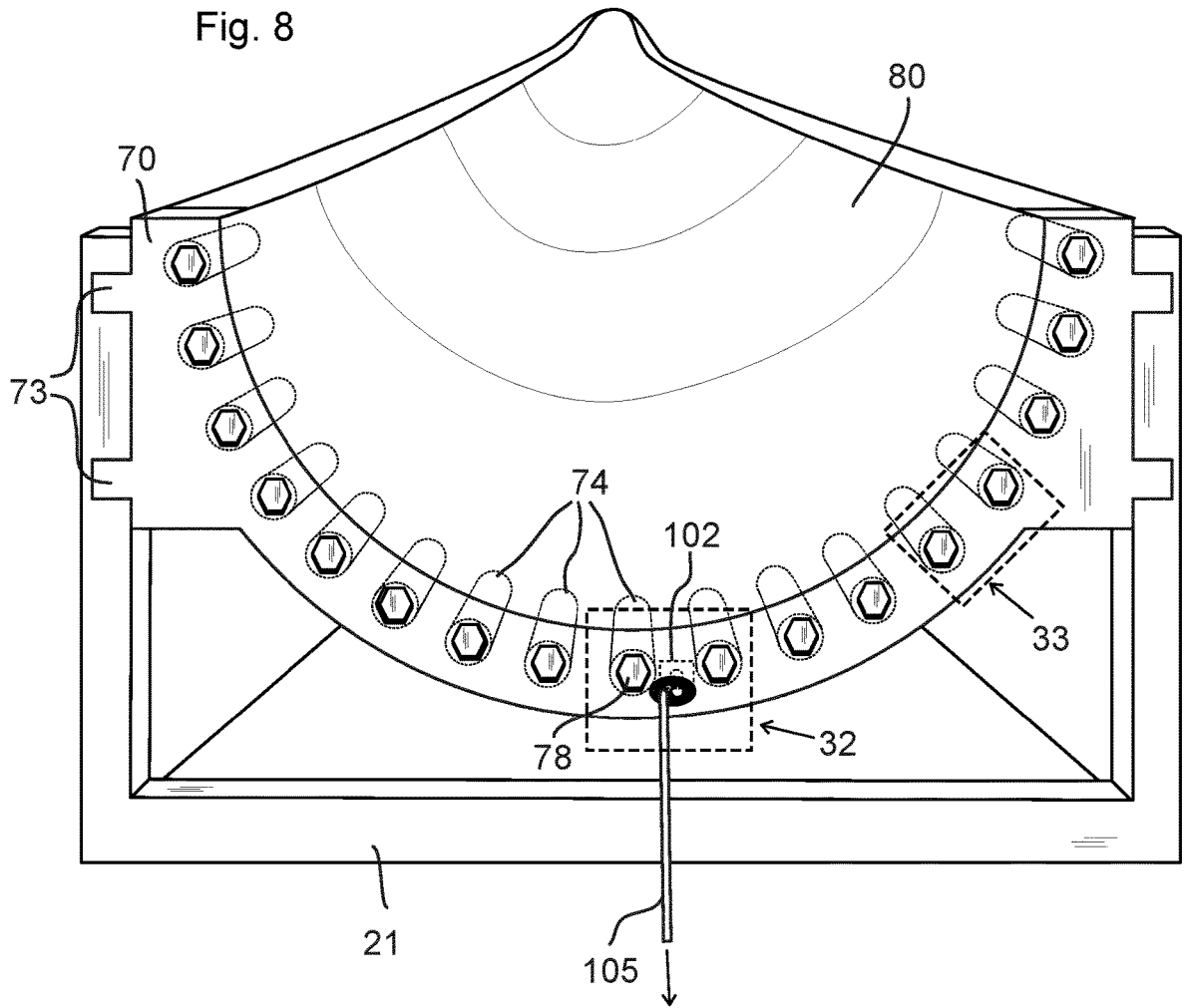
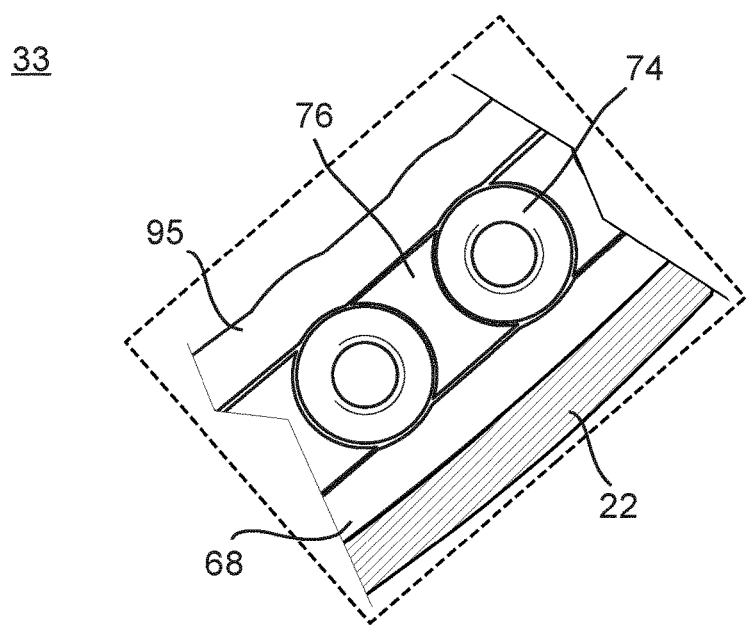
Fig. 9

MANUFACTURING A WIND TURBINE BLADE SHELL PART

This is a National Phase Application filed under 35 U.S.C. 371 as a national stage of PCT/EP2020/056802, filed Mar. 13, 2020, an application claiming the benefit of European Application No. 19164310.5, filed Mar. 21, 2019, the content of each of which is hereby incorporated by reference in its entirety.

TECHNICAL FIELD

The present invention relates to a method for manufacturing a wind turbine blade shell part made of a composite structure comprising a fibre-reinforcement material embedded in a polymer matrix via vacuum assisted resin transfer moulding, and to a root end assembly for a wind turbine blade shell part.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats in each of the two mould parts. Then, the two sides are glued together, often by means of internal flange parts. Glue is applied to the inner face of the lower blade half before the upper blade half is lowered thereon. Additionally, one or two reinforcing profiles (beams) are often attached to the inside of the lower blade half prior to gluing to the upper blade half.

The aerodynamic shell parts are typically made by use of Vacuum Assisted Resin Transfer Moulding (VARTM), where a plurality of fibre mats are arranged on top of rigid mould parts and possibly also a core material to provide parts having a sandwich structure. When the fibre mats have been stacked and overlapped so as to form the final shape of the wind turbine blade shell part, a flexible vacuum bag is arranged on top of the fibre mats and sealed against the rigid mould part, thereby forming a mould cavity containing the fibre mats. Resin inlets and vacuum outlets are connected to the mould cavity. First the mould cavity is evacuated via the vacuum outlets so as to form an underpressure (also known as a negative pressure), such as for instance 5-10% of standard pressure, 101.3 kPa, preferably lower, in the mould cavity, after which a supply of liquid resin is provided via the resin inlets. The resin is forced into the mould cavity at least due to the pressure differential, where it impregnates the fibre material. This process is also known as infusion. When the fibre material has been fully impregnated, the resin is cured, whereby the final composite structure results, i.e. the wind turbine blade shell part.

The terms polymer and resin are used interchangeably. Polymers may be in liquid form or cured form. The resin used in the VARTM process is a liquid polymer.

From the resin inlets the resin disperses in all directions in the mould cavity due to the negative pressure which drives the resin flow front(s) towards the vacuum outlets. It is important to position the resin inlets and vacuum outlets optimally in order to obtain a complete filling of the mould cavity. However, ensuring that the resin fills the entire mould cavity presents some challenges. For instance, so-called dry spots may occur. These are regions where the fibre material has not been fully impregnated with resin. Air pockets may also form, in which underpressure has not even formed. In vacuum infusion techniques employing a rigid mould part and a resilient upper mould part, for instance in the form of a vacuum bag, the dry spots and air pockets can be eliminated after the infusion process. This can be done for instance by puncturing the vacuum bag in the respective locations and inject liquid resin, for example by means of a syringe. However, this is a very time-consuming process. Furthermore, in the case of large mould parts, staff may have to stand on the vacuum bag, which is not desirable, especially when the resin has not yet cured. It may lead to deformations in the fibre material which can result in local weakening of the structure. This may, in turn, cause for instance buckling.

Wind turbine blades have become increasingly longer over the years. Blades having lengths of more than 80 m are now commercially available. Blade lengths will likely continue to increase for the foreseeable future. This also means that larger moulds have to be used, which only exacerbates the problem of dry spots.

SUMMARY OF THE INVENTION

Accordingly, there is a need for apparatus and method that may improve the quality of the wind turbine blade shell parts or at least decrease the risk of weaknesses occurring. There is also a need to reduce the cycle time of the various processes involved in the manufacturing of wind turbine blade shells.

According to a first aspect, the invention provides a method for manufacturing a wind turbine blade shell part made of a composite structure comprising a fibre-reinforcement material embedded in a polymer matrix via vacuum assisted resin transfer moulding. The method comprises steps of:

mounting a plurality of fastening devices on a first side of a mounting plate so as to form a root end assembly, the mounting plate comprising one or more first openings for evacuating air, the mounting plate having a second side opposite the first side, arranging the root end assembly, one or more outer fibre layers defining an outer surface of the wind turbine blade shell part, and one or more inner fibre layers on a mould surface of a mould such that the fastening devices are arranged above a root end section of the mould and are embedded between the one or more outer fibre layers and the one or more inner fibre layers, arranging an air-tight cover member so as to form a mould cavity defined by the air-tight cover member, the mould surface, and the mounting plate, with the one or more outer fibre layers, the one or more inner fibre layers, and the fastening devices arranged within the mould cavity, evacuating air from the mould cavity via at least the one or more first openings of the mounting plate, and supplying a polymer into the mould cavity and allowing the polymer to cure so as to form the composite structure.

In known setups, air mainly follows the same path as the polymer and may encounter for instance peel ply, which restricts both the polymer flow and the airflow. The K22 (transverse) permeability of the peel ply or similar material used to connect the flow source to the layup is a significant limitation.

Embodiments of the present method have the advantage that air is evacuated directly from the fibre material layup, which is the most permeable path for air to be removed from the mould cavity. In this way, air does not have to pass from the fibre material layup through process consumables such as peel ply to the vacuum source (i.e. to the vacuum outlets). This leads to a significantly faster evacuation processes, with a better control of the target vacuum level.

The fibre layers may comprise any type of reinforcement fibres suitable for reinforcing large composite structures, such as glass fibres, carbon fibres or aramid fibres. Fibre mats may comprise unidirectional fibres, biaxial fibres, triaxial fibres or randomly oriented fibres. Part or parts of the blade may be provided pre-cured, for instance laid up separately and cured, or as pultruded elements.

In some embodiments, arranging the root end assembly, the one or more outer fibre layers, and the one or more inner fibre layers comprises:
  arranging the one or more outer fibre layers on the mould surface,
  arranging the root end assembly such that the fastening devices are arranged above the one or more outer fibre layers at the root end section of the mould,
  arranging the one or more inner fibre layers on top of the fastening devices subsequent to arranging the root end assembly such that the fastening devices are arranged above the one or more outer fibre layers at the root end section of the mould.

The mounting plate may remain on the root end of the wind turbine blade shell part after the manufacture of the shell part and only be removed for instance prior to installment of the wind turbine blade on the wind turbine hub. Thereby, the rigid mounting plate ensures that the root end of the blade does not deform during storage. In manufacturing methods where the blade shell is manufactured using two or more blade shell parts, such as the suction side shell part and the pressure side shell part, the mounting plate may optionally remain attached to the blade shell parts during a step of gluing the blade shell parts together.

In some embodiments, the method further comprises blocking at least one of the one or more first openings with a semipermeable material that is permeable for air and nonpermeable for the polymer. This prevents the polymer from leaking through the one or more first openings, which could make it difficult or even impossible to sufficiently evacuate the mould cavity and fully impregnate the fibre material in the mould cavity with polymer.

In some embodiments, the first opening is blocked by attaching the semipermeable material, e.g. in the form of a patch, over the first opening at least on the first side of the mounting plate. This prevents polymer from filling the first opening as such. In some embodiments, blocking the at least one first opening comprises attaching the semipermeable material (e.g. in the form of a patch) over the opening on a second side of the mounting plate opposite the first side of the mounting plate. The two may be combined, whereby the opening is blocked with a semipermeable material on both sides of the mounting plate, e.g. using a patch at each end of the opening. Covering the opening twice reduces the risk that polymer leaks from the mould cavity in case one of the patches becomes dislodged and no longer blocks the opening. The semipermeable material used on the second side may be the same as the semipermeable material used on the first side, or it may be different. Preferably, they are both permeable for air and impermeable for the polymer.

Covering the at least one first opening may comprise attaching the semipermeable material to the mounting plate using a tacky material and/or a glue.

Some embodiments comprise a step of ceasing suction at a particular opening of the one or more first openings in the mounting plate if the particular opening becomes blocked by polymer from the mould cavity. This reduces the risk of polymer leaking from the mould cavity. Ceasing suction at the particular opening may for instance comprise switching off suction means providing suction at the particular opening.

As an example of how suction through a first opening can be provided, some embodiments comprise a step of sealing at least one of the one or more first openings with a flexible air-tight material on the second side of the mounting plate and providing suction through an opening in the air-tight material. In some embodiments, the opening in the air-tight material is offset from the at least one first opening sealed with flexible air-tight material. When the opening is blocked by polymer supplied into the mould cavity, the flexible air-tight material sealably collapses onto the mounting plate and prevents further suction through the opening. The air-tight material may for instance be one or more vacuum bags.

In some embodiments, a suction hose is releasably attached to the mounting plate in fluid communication with at least one of the one or more first openings, and the method further comprises providing suction through the suction hose. This may be done for instance as described above, by using a flexible air-tight material.

In some embodiments, the mounting plate has a threaded member, for instance made of metal or at least a sufficiently rigid material to support the evacuation process. The mounting plate may for instance have a threaded pipe surrounding the opening in order to ensure the abovementioned fluid communication, the threaded pipe having an internal or an external threading. The suction hose has a corresponding mating threaded member for engaging with the threaded pipe. Other equivalent arrangements of threading may be used instead.

In some embodiments, the suction hose is attached to the mounting plate by quick connector means, such as a push-to-connect connector. These embodiments are more robust than the air-tight flexible material described above, although that method has certain advantages.

In some embodiments, the fluid communication is interrupted by a semipermeable material that is permeable for air and nonpermeable for the polymer. This prevents polymer from leaking past the semipermeable material. The semipermeable material may for instance be arranged in the mounting plate and/or in the suction hose in such a way that polymer is prevented from leaking past the semipermeable material. Semipermeable material may alternatively or additionally be inserted between the suction hose and the mounting plate as part of the step of releasably attaching the suction hose. In this embodiment, if the semipermeable material ruptures, it may be easily replaced.

A second aspect provides a root end assembly for a wind turbine blade shell part. The root end assembly comprises:
  a mounting plate having a first side and a second side, and
  a plurality of fastening members mounted on the first side of the mounting plate, the mounting plate being adapted to be removed after the root end assembly has been mounted in the wind turbine blade shell part, the mounting plate further comprising one or more first openings blocked with a semipermeable material that is permeable for air and nonpermeable for a fibre-reinforcement polymer, whereby the polymer is prevented from passing through the one or more first openings.

Such a root end assembly is particularly suitable for use in embodiments of the first aspect of the invention.

The parts other than the mounting plate are integrated into the shell part during curing. These constitute a root end insert. In other words, the root end assembly comprises the mounting plate with the root end insert attached.

The fastening members may for instance be bushings. The bushings may be arranged so that the openings of the bushings are accessible from the root end of the blade shell, whereby the wind turbine blade may be mounted on the hub of a wind turbine by use of stay bolts inserted into the openings of the bushings.

According to an advantageous embodiment, the bushings are mounted on the mounting plate by use of stay bolts. The bushings are mounted on the first side of the mounting plate and the stay bolts are inserted from the second side through openings in the mounting plate. The mounting plate may be removed from the root end by first removing the stay bolts and then removing the mounting plate.

In some embodiments, the mounting plate is provided with guiding recesses for insertion of one end of the fastening members. This provides a way to ensure correct alignment and orientation of the fastening members in the root end during manufacturing.

The preparation of the root end assembly may further comprise the step of mounting inserts between the fastening members. The inserts may for instance be retaining inserts, such as butterfly wedges, which aid in retaining the fastening members and further ensure that the fastening members are arranged with the correct mutual spacing. The fastening members and the inserts may for instance be arranged on the root end assembly by alternately arranging fastening members and inserts, preferably along an at least substantially circular or semi-circular path on the mounting plate.

The fastening members are typically made of metal or metal alloy, such as cast iron or steel, such as stainless steel. Fibre material, e.g. glass fibre, may be arranged around the fastening members, which helps ensure that when the root end assembly is arranged on the mould and the infusion of resin into the mould cavity is carried out, the fastening members become securely bonded within the inner and outer fibre layers. The outer fibre layer(s) may advantageously comprise biaxial fibre mats. The inner fibre layer(s) may advantageously comprise triaxial fibre mats.

In some embodiments, the mounting plate is provided with attachment devices for attaching the mounting plate to a holding device which holds the root end assembly correctly relative to the mould surface. The attachment devices may for instance include pins that may engage with or rest on e.g. hooks provided on the holding device. The holding device may be integrated with the mould. The mould may also be provided with a lowering mechanism adapted to carry and lower the root end insert onto the mould surface of the mould. This provides another way of ensuring that a root end insert that has been separately prepared may be lowered and arranged very precisely onto the mould surface. In addition, the lowering process can to a high degree be carried out without human involvement. Such a method and device are described in detail in international patent application publication WO 2014/191046 A1.

Preferably, the mounting plate comprises between 2 and 10 first openings distributed around the semi-circular shape of the mounting plate, in some embodiments equidisstantly. This results in efficient evacuation through the mounting plate while at the same time keeping the required additional measures and time associated with setting up evacuation through the first openings reasonably low compared to the benefit obtained.

BRIEF DESCRIPTION OF THE DRAWINGS

The invention is explained in detail below by way of example with reference to the drawings.

FIG. 8 shows a schematic view of a mould and a root end assembly during vacuum assisted resin transfer moulding of a wind turbine blade shell part.

FIG. 9 shows a schematic view of part of a root end insert embedded in fibre layers on a mould surface.

DETAILED DESCRIPTION OF THE INVENTION

Figure 1:
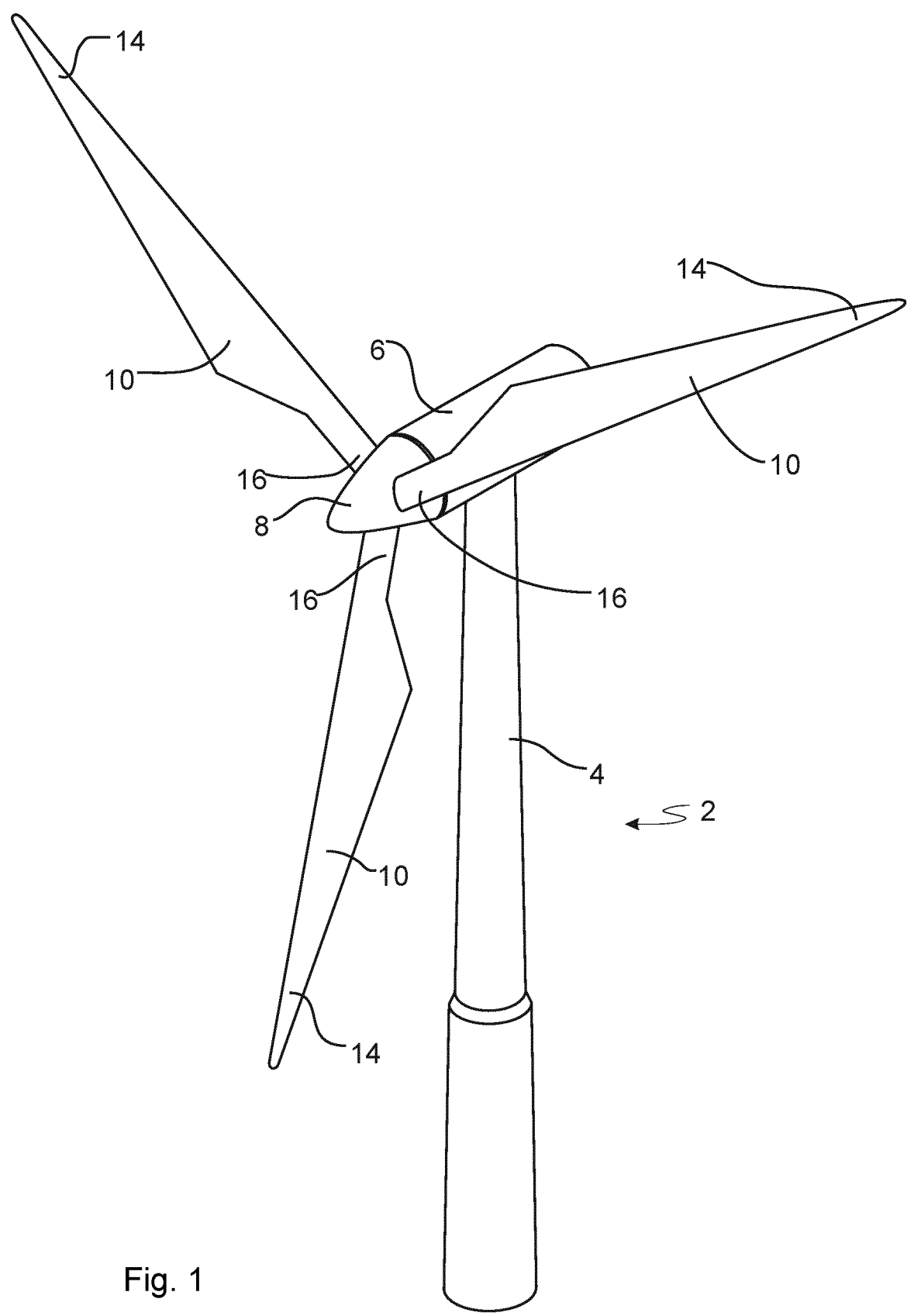
FIG. 1 shows a schematic view of a wind turbine having three wind turbine blades.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

The wind turbine blades 10 are manufactured as fibre-reinforced composite structures comprising a fibre-reinforcement material embedded in a polymer matrix. The individual blades 10 comprise an aerodynamic shell, and the suction side and the pressure side of the aerodynamic shell are often manufactured as separate parts in moulds 20 such as the one shown schematically in FIG. 2. The blade shell parts are manufactured separately by arranging the fibre-reinforcement material and typically also sandwich core material, such as foamed polymer or balsawood, on a mould surface 22 of the mould. The fibre reinforcement material may for instance be laid out as separate fibre mats 24 that are stacked overlapping on the mould surface 22. The load bearing structure of the blade 10 may for instance be manufactured as a spar cap integrated in the blade shell, also called a main laminate, with shear webs arranged between the spar caps of the pressure side shell part and the suction side shell part. Alternatively, the load bearing structure may be formed as a spar or a beam, and the aerodynamic shell is adhered to the load bearing structure. The two blade shell parts are glued to each other, e.g. by use of internal flange parts. The fibre mats 24 may be laid up manually on the mould surface 22 and/or by use of a fibre mat layup system, in which case the fibre mats 24 may be laid up automatically or semi-automatically.

Figure 2:
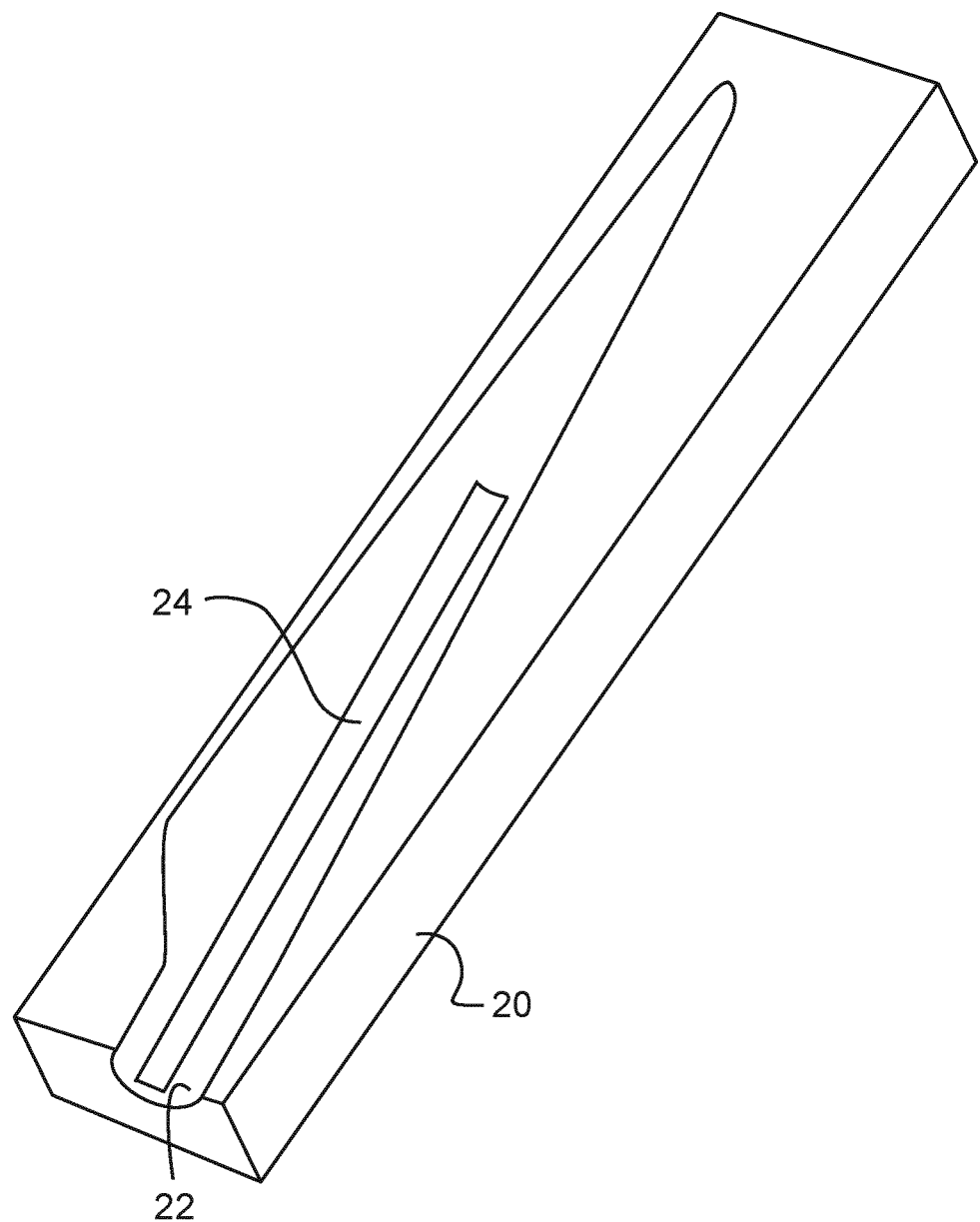
FIG. 2 shows a schematic view of a mould used for manufacturing a wind turbine blade shell part.
Figure 3:
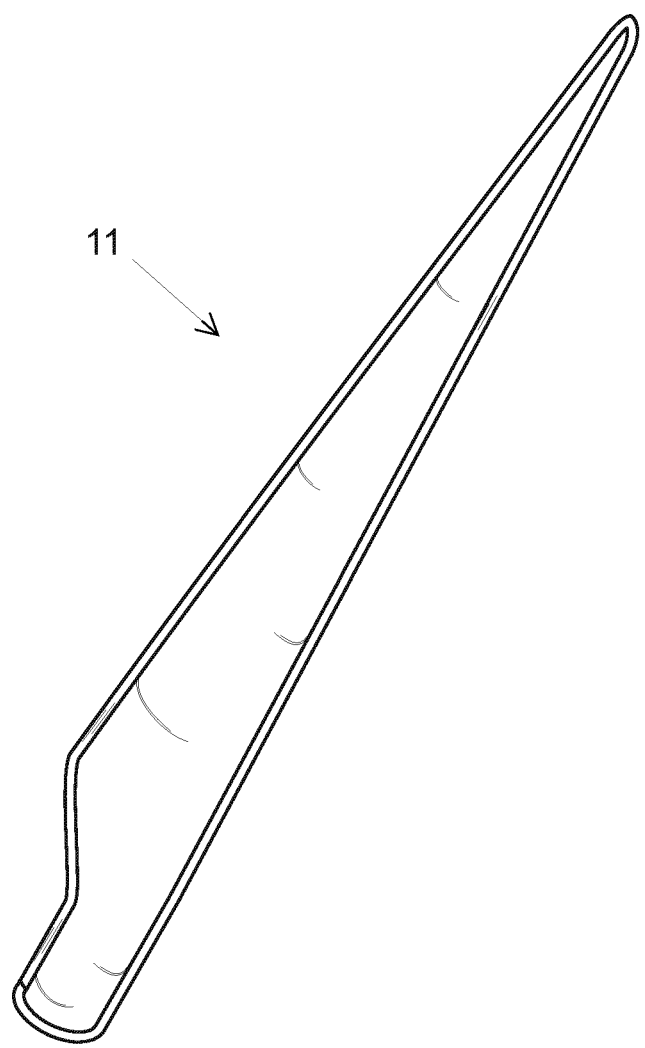
FIG. 3 shows a schematic view of a wind turbine blade shell part having a shape corresponding to the mould of FIG. 2.

FIG. 3 illustrates schematically a wind turbine blade shell part manufactured in the mould 20 of FIG. 2.

Figure 4:
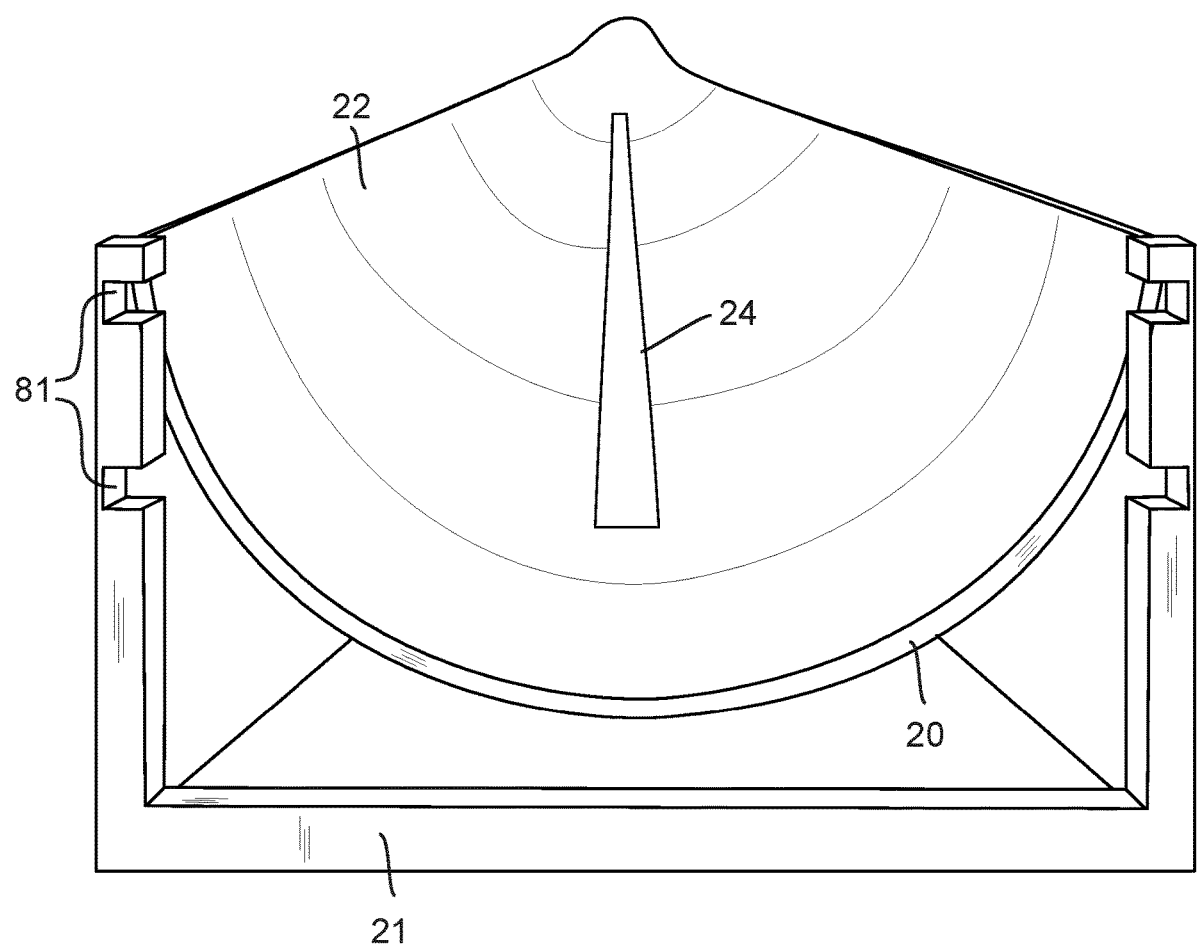
FIG. 4 shows a schematic view of a mould used for manufacturing a wind turbine blade shell part.

FIG. 4 shows schematically a mould 20 including a frame 21. The mould has a mould surface 22. For exemplification, a fibre mat 24 is shown arranged on the mould surface 22 of the mould 20. In this example, the frame 21 has recesses 81 for receiving and holding a mounting plate that holds a root end insert. The mounting plate with the root end insert attached is also called root end assembly. The shape of the mould in FIG. 4 is simplified. Typically, the root end of the mould is such that the resulting blade shell is semi-circular near a part of the root end, as shown in FIGS. 1-3.

Figure 5:
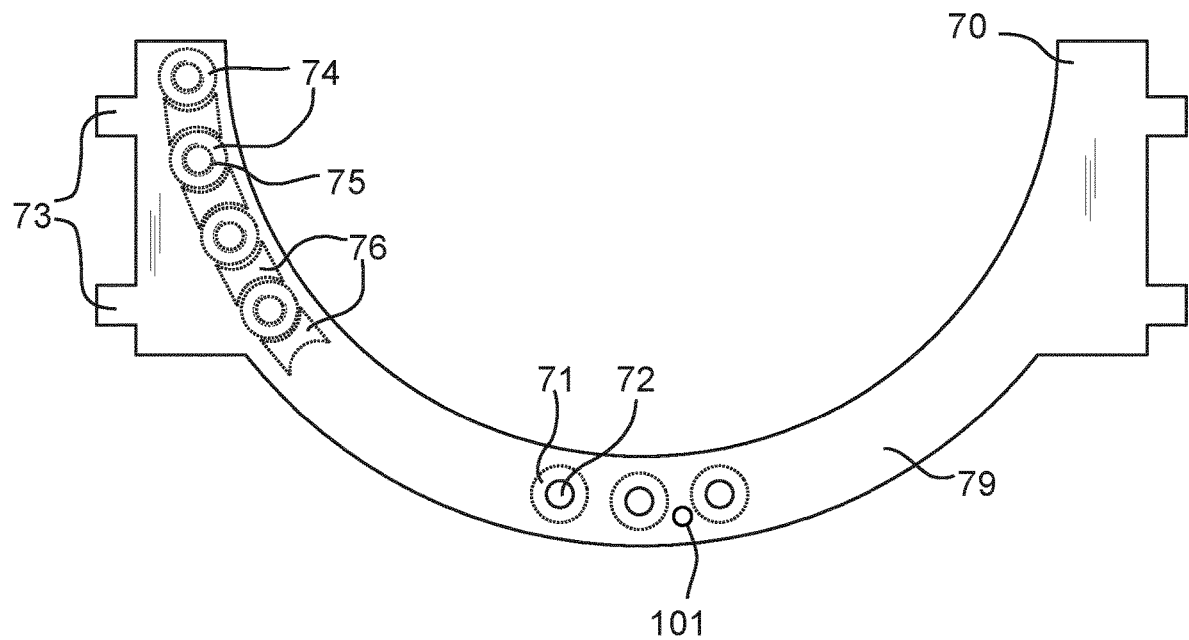
FIG. 5 shows a schematic view of a mounting plate.
Figure 6:
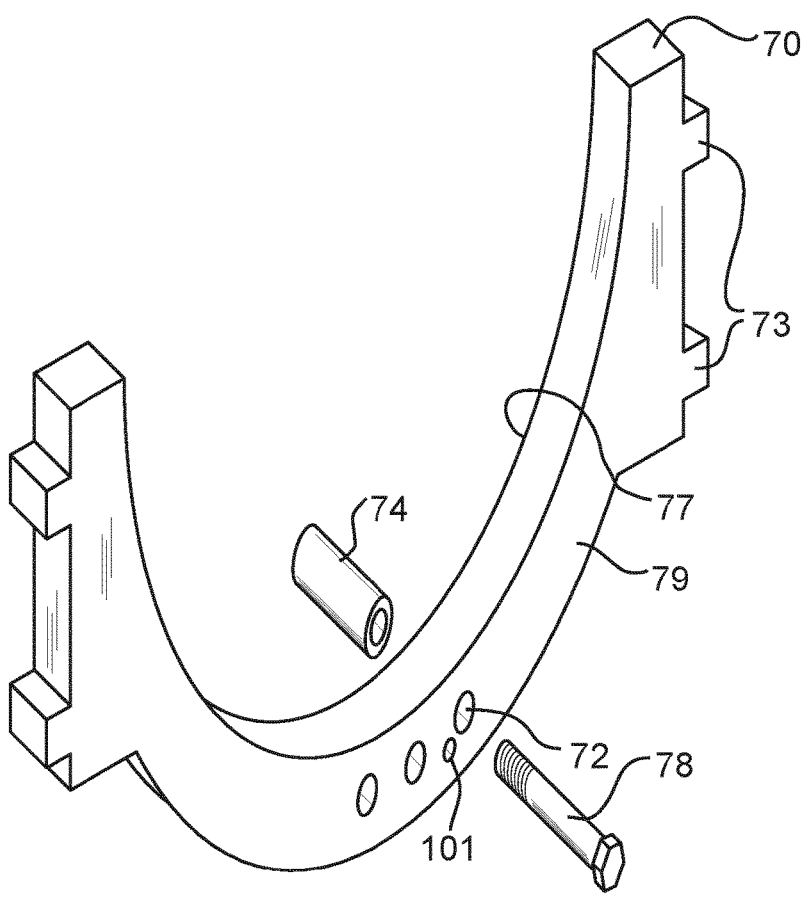
FIG. 6 shows a schematic perspective view of a mounting plate and a fastening member and a stay bolt for holding the fastening member in place on the mounting plate.

FIGS. 5 and 6 show a mounting plate 70 that can be used for preparing a root end insert comprising a number of fastening members, in this example in the form of bushings 74 and optionally retaining inserts, in this example in the form of butterfly wedges 76 arranged between the fastening members 74. FIG. 5 schematically shows the elements of a root end insert held by the mounting plate 70. The mounting plate 70 together with the root end insert form a root end assembly, as noted above. The mounting plate 70 may be used for arranging the root end insert for instance on the mould surface 22 of the mould 20 or on (outer) fibre layer(s) pre-arranged on the mould surface 22. The mounting plate 70 may be removed after the root end insert has been firmly attached in the shell part and prior to instalment of the wind turbine blade 10 on a wind turbine hub 8 as shown in FIG. 1.

The mounting plate 70 has a first side 77 and a second side 79, as shown in FIGS. 5 and 6. In this example, the mounting plate 70 is provided with a plurality of recesses 71 on the first side 77 of the mounting plate 70 and a plurality of through-going holes 72. The holes 72 are centrally aligned with the recesses 71. FIGS. 5 and 6 show only a few recesses 71 and holes 72. However, in practice these are arranged along an entire semicircle of the mounting plate 70, typically equidistantly.

The bushings 74 are mounted in the recesses 71 of the mounting plate 70 by inserting ends of the bushings 74 in the recesses. The bushings 74 are provided with central holes having inner threads 75. The bushings 74 may be retained in the recesses by inserting stay bolts 78 from the second side 79 of the mounting plate 70 through the holes 72 of the mounting plate. The bushings then extend out from the first side 77 of the mounting plate and are oriented substantially normal to a plane of the mounting plate 70.

The root end insert may be prepared for instance by first mounting a first bushing 74 on the mounting plate and then arranging a first wedge 76 next to and abutting the first bushing. Afterwards a second bushing 74 is arranged next to the first wedge 76 and a second wedge 76 next to the second bushing 74. This procedure is then repeated until bushings 74 and wedges 76 are arranged along the entire semi-circle on the mounting plate.

In the examples in FIGS. 5 and 6, the mounting plate 70 is provided with protrusions 73, such as pins or rods, which extend for instance from the side of the mounting plate 70. These protrusions 73 may be used as connection parts for providing a mating connection to corresponding parts on a frame of the mould, such as frame 21 illustrated in FIG. 4, or to a lowering mechanism for arranging the root end insert on the surface 22 of the mould 20. The protrusions 73 are just one form of means for mating the mounting plate with a frame or a lowering mechanism. A lowering device as described in WO 2014/191046 A1 could for instance be used. For the purpose of the present description, connection parts or a lowering device is not essential and are not shown or described in further detail.

FIGS. 5 and 6 illustrate an essential feature of the invention, a separate opening 101 in the mounting plate, or a plurality of such openings.

The one or more openings 101 are provided such that when the root end insert is arranged between the mould surface 22 and a vacuum bag, air can be evacuated from the mould cavity via the separate openings 101 of the mounting plate 70.

Figure 7:
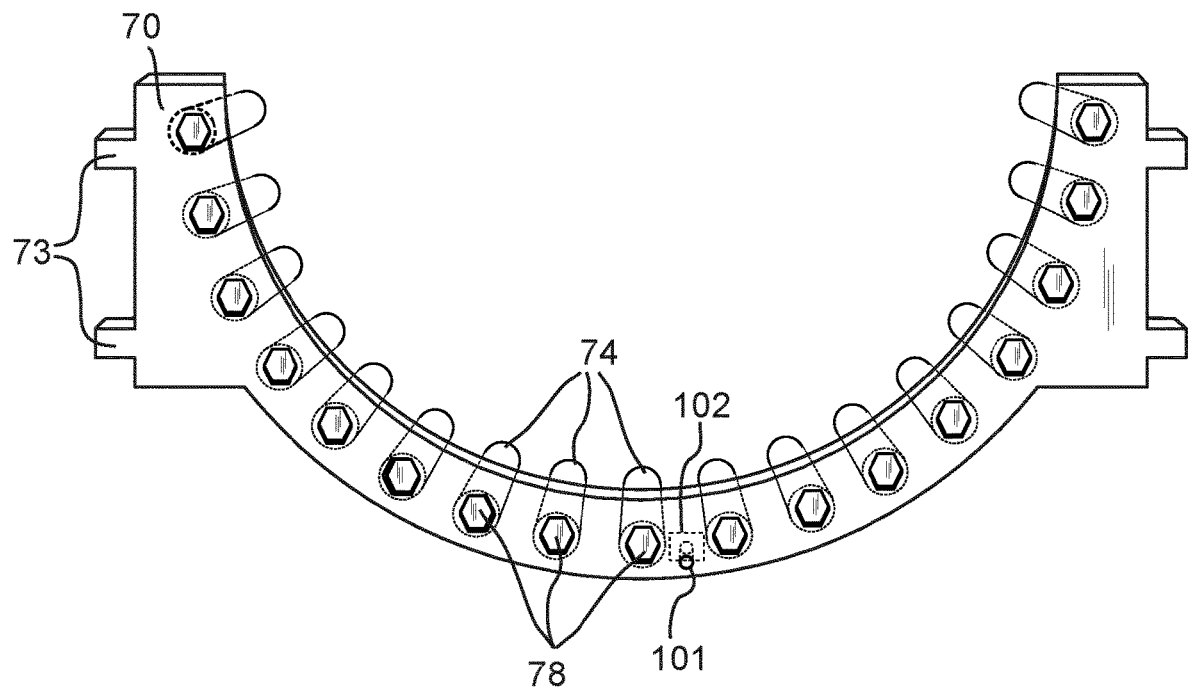
FIG. 7 shows a schematic rear view of a root end assembly in accordance with an embodiment of the invention.

FIG. 7 illustrates a root end assembly 100 with bushings 74 held by stay bolts 78 attached to the mounting plate 70 shown in FIGS. 5 and 6. The separate opening 101 in the mounting plate 70 can also be seen. A semipermeable material in the form of a patch 102 is arranged on the first side 77 of the mounting plate 70. For simplicity, the root end assembly does not illustrate any wedges or fibre layers, only the fastening members 74 held by stay bolts 78, together with the patch 102 that covers the opening 101. Use of this root end assembly 100 for manufacturing a wind turbine blade shell part is described in further detail below.

FIG. 8 illustrates the root end assembly 100. The root end insert is arranged inside the mould cavity, which is defined by air-tight cover member 80 (such as vacuum bag), the mould surface 22 (not visible), and the mounting plate 70. The root end assembly is attached to the frame 21 using the protrusions 73 of the mounting plate 70 engaging with the recesses 81 of the frame 21 shown in FIG. 4. The root end assembly may alternatively be positioned precisely relative to the mould surface by other means, as described previously, such as by a lowering mechanism. Detail area 32 relates to the process of evacuating air from the mould cavity via the opening 101 in the mounting plate 70. This is described in detail with reference to FIGS. 10 and 11.

FIG. 9 illustrates an example of part of a root end insert corresponding to detail area 33 of FIG. 8, embedded in fibre layers. Detail area 33 is an example of what might be seen if the mounting plate 70 were removed after layup.

The following describes manufacturing steps that result in the arrangement shown in FIG. 8.

The layup procedure leading to the arrangement illustrated in FIG. 9 may include arranging one or more outer fibre layers 68 on the mould surface 22 of the mould 20. The outer fibre layers 68 advantageously comprise biaxial fibre layers, e.g. with the fibres oriented −45 and 45 degrees compared to the longitudinal direction of the mould. The biaxial fibre layers provide a strong mechanical bonding to fastening members 74 mounted on the mounting plate 70. The fastening members 74 are part of the final product, i.e. the wind turbine blade, and are used for mounting the root end of the blade 10 to the wind turbine hub 8 shown in FIG. 1. The biaxial fibres provide strength both in the longitudinal direction and the transverse direction of the blade and thus help to ensure that the fastening members are not pulled out from the wind turbine blade root during operation. Fibre mats are laid up in the mould using appropriate methods to provide at least part of the desired structure of the shell part 11. The root end insert is arranged on top of the outer fibre layers 68. Afterwards, a number of inner fibre layers 95 are arranged on top of the root end insert. The inner fibre layers 95 may for instance be triaxial fibre layers comprising reinforcement fibres oriented −45 degrees, 0 degrees and 45 degrees compared to the longitudinal direction of the blade shell part 11. This provides strength in both the longitudinal direction and the transverse direction of the blade shell part and increases the pull-out strength of the bushings 74. The root end insert of FIG. 9 also contains wedges 76 arranged between the bushings 74. The stay bolts 78 are not part of the root end insert, but only serve to hold the root end insert onto the mounting plate 70. Thus, stay bolts are not shown in FIG. 9.

Next, a vacuum bag 80 is sealed against the mould 20, as illustrated in FIG. 8, and the mould cavity formed between the vacuum bag 80, the mounting plate 70, and the mould surface 22 is evacuated. Embodiments of the invention use at least opening(s) 101 in the mounting plate for evacuating the mould cavity. In the prior art, evacuation is performed through vacuum outlets elsewhere. Such vacuum outlets are also advantageous in combination with embodiments of the present invention, since it is desirable to evacuate the mould cavity both as quickly as possible and as thoroughly as possible. However, the openings 101 are a surprisingly efficient addition or replacement to the known way of evacuating mould cavities.

After or during evacuation, liquid resin is pulled into the mould cavity by aid of the negative pressure and may also be actively pushed into the mould cavity. In the mould cavity, the resin impregnates the fibre material. Finally, the resin is cured, whereby the fibre-reinforced shell part 11 is formed. This shell part may then be adhered to another shell part to form the aerodynamic shell of a wind turbine blade 10. The mounting plate may be removed after forming the shell part. The mounting plate may also be left in place and only be removed some time after adhering the two shell parts.

Besides speeding up evacuation, providing evacuation via the openings 101 aids transport to and distribution of resin in the vicinity of bushings 74, wedges 76 and the outer fibre layers 68 and the inner fibre layers 95 between which the bushings are sandwiched, as shown in FIG. 9. Known methods are not nearly as efficient in this respect. As a result of the improved method, the blade at the root end is stronger, and the likelihood of air pockets and associated lack of wetting of the fibre material is reduced, or at least the process of entirely wetting the mould cavity is sped up since the method leads to fewer or no air pockets that must eliminated manually. As mentioned, this is time consuming and may lead to a blade having a lower strength.

In the following, the evacuation through openings 101 will be described in more detail.

Evacuation through openings 101 can be performed without any additional measures, as the advantages of evacuating through the openings 101 in the mounting plate are still achieved. However, evacuating through the openings 101 without further measures being taken has the disadvantage that resin may be sucked through the openings 101 once resin reaches the openings 101 from the mould cavity side of the mounting plate 70. This would allow resin to continuously leak from the mould cavity. To avoid this, suction through the openings may be stopped manually. However, this is cumbersome and requires supervision.

Thus, in some embodiments the openings 101 are blocked by a semipermeable material, such as in the form of a patch 102 applied to the mounting plate 70. The patch is permeable for air and nonpermeable for the resin, whereby resin is prevented from leaking through the first openings 101. Such a patch 102 is shown arranged over the opening 101 on the first side of the mounting plate 70 in the root end assembly shown in FIG. 7, as well as in FIGS. 8, 10, and 11.

Figure 10:
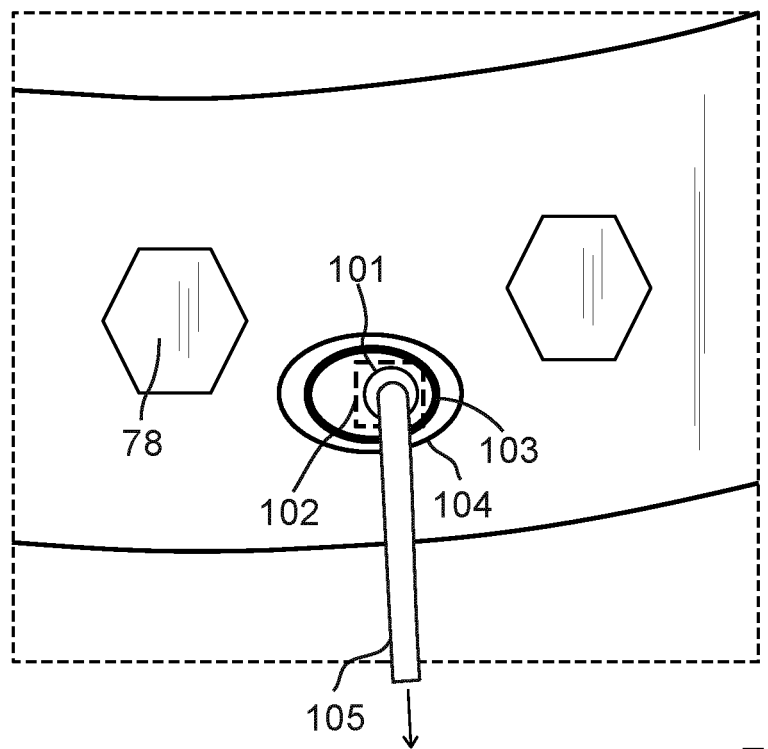
FIGS. 10-11 show schematic views of a detail of the root end assembly during mould cavity evacuation.

FIG. 10 shows the detail area 32 indicated in FIG. 7. In the embodiment in FIG. 10, tacky tape 103 is arranged on the second side 79 of the mounting plate 70, surrounding the opening 101. The tacky tape 103 engages with a flexible air-tight material 104, e.g. the material that the vacuum bag is made of, to form a cavity on the second side 79 of the mounting plate 70. The size of the cavity is defined by the tacky tape 103 arranged around the opening. A suction hose 105 is attached to the cavity formed by the tacky tape 103 together with the air-tight material 104 to allow evacuation of air from that cavity. The hose is initially in fluid communication with the mould cavity via opening 101, thereby allowing evacuation of the mould cavity via the hose 105. As described above, this reduces the risk of air pockets remaining. The blade shell part is particularly complex near the root end, which comprises the root end insert with bushings and in some cases wedges, as well as surrounding fibre layers 68 and 95 at the root end. Evacuating the mould cavity through the mounting plate, past the complex root end parts, forces resin towards and through or past the different parts of the root end, faster and more thoroughly. With known methods, this is significantly more difficult to achieve automatically.

Evacuating through several openings of the type 101 enhances the improvement. It may be advantageous to have one or more openings at or near a lowest point of the mould surface 22 at the root end (lowest with respect to the force of gravity), or at least within a vertical distance of 20 cm, such as within 10 cm, above the lowest point of the mould surface 22 at the root end. The top-most part of the mould cavity can also present a region which is difficult to completely evacuate and fill automatically. Thus, having one or more openings in the mounting plate for instance within a vertical distance of 20 cm, such as within 10 cm, from a highest point of the mould surface 22 at the root end (highest with respect to the force of gravity) may be advantageous.

In the embodiment in FIG. 10, the hose is located at the opening 101. When the patch 102 eventually becomes blocked by resin as the resin moves towards the mounting plate 70, past and through the root end insert parts and fibre layers, the pressure in the cavity on the second side of the mounting plate 70 will drop. This may cause the patch to accidentally become dislodged from the mounting plate and be pulled through the opening together with resin. In a non-supervised environment, this may lead to resin being continually sucked out of the mould cavity through the hose. To avoid this, the suction through hose 105 can be switched off. This can be done manually or by automatically switching off the pump providing suction at the opening, for instance in response to the pressure dropping below a predetermined value, such as below 380 torr, such as below 190 torr, such as below 76 torr, such as below 38 torr.

In case there are several openings 101 in the mounting plate 70 all providing evacuation of the mould cavity, manually switching off the suction at a particular opening is impractical and error-prone. In case the openings 101 share the same pump, switching off the pump is not an option, since the patches 102 covering the different openings 101 typically become blocked at different times because the resin typically reaches the respective patches 102 at different times. The embodiment in FIG. 11 solves this problem. As can be seen, the hose is offset from the opening 101. When the patch 102 eventually becomes blocked by resin as the resin moves in the mould cavity, the pressure in the cavity on the second side of the mounting plate 70 will drop, just as in FIG. 10. However, because the hose is offset from the opening, the flexible air-tight material 104 will collapse onto the second side of the mounting plate 70. When this happens, suction via hose 105 will seize to apply at the opening 101 because the air-tight material 104 effectively forms a seal around the hose 105 in the cavity defined by the tacky tape 103 and the air-tight material 104. Suction is then essentially only present in a space around this area. The suction provided via hose 105 is thereby prevented from dislodging the patch 102 in this embodiment. Although the embodiment is advantageous even when there is only a single opening 101 in the mounting plate, it is particularly advantageous in case there is a plurality of openings 101 as also described in relation to FIG. 10. In the embodiment in FIG. 11, each opening 101 will be blocked when resin covers the corresponding patch. Thus, suction through the mounting plate can be performed unsupervised, or at least with less supervision. Resin is no longer at risk of leaking from the mould cavity. The embodiment in FIG. 11 therefore also lends itself to the use of the same pump for a plurality of openings 101, since each opening is blocked independently once resin reaches the opening 101 and blocks the corresponding patch 102.

Figure 11:
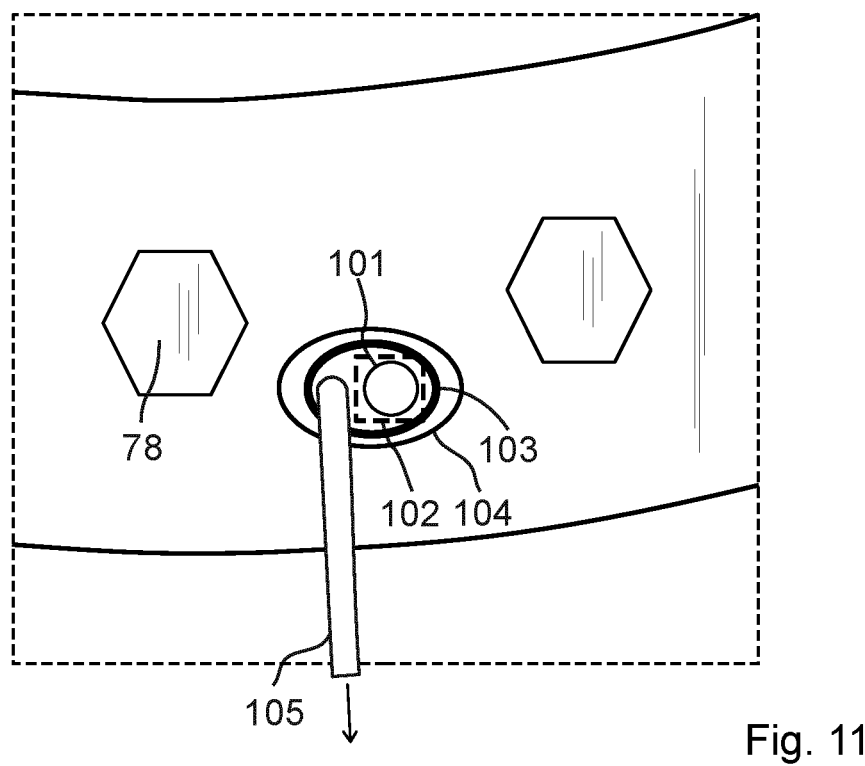

Another advantage of the embodiment in FIG. 11 is that in case an air pocket has formed within the mould cavity near an opening 101, the air pocket is more likely to be eliminated. When the air pocket reaches the patch, air may exit through the opening 101. This allows the air-tight material 104 on the second side of the mounting plate to pull away from the mounting plate, whereby the seal around the hose that protects the patch from being dislodged is broken. The hose suction will therefore once again be in fluid communication with the mould cavity, and the air pocket can be eliminated, or at least reduced, via the opening 101. This provides a pull on the resin in the mould cavity, whereby the space near the opening can be filled with resin.

In some embodiments, the mounting plate has a connection member for attaching a suction hose to provide evacuation through the mounting plate 70. The connection member is preferably rigid, for instance made of metal or plastic or at least a flexible material sufficiently resilient to support the evacuation process. The connection member may be a threaded member accessible from the second side 79 of the mounting plate 70 to allow attachment of the suction hose. The mounting plate may for instance have a threaded metal pipe surrounding the opening 101 in order to allow for the abovementioned fluid communication and resilience. The threaded pipe may have an internal or an external threading. Evacuation is provided by the suction hose 105 attached to the threaded pipe using a mating threaded part on the suction hose. Other equivalent arrangements of threading may be used instead to provide the connection between the mounting plate and the suction hose. A suction hose may alternatively be attached to the mounting plate by quick connector means, such as by a push-to-connect connector. Embodiments that use a threading or quick connector means are more robust than the air-tight flexible material described above in relation to FIGS. 10 and 11, although that method has certain advantages.

Embodiments that use a preferably rigid connection member may advantageously have a semipermeable material that is permeable for air and nonpermeable for the polymer interrupt the fluid communication. This prevents polymer from leaking past the semipermeable material. The semipermeable material may for instance be arranged in the mounting plate in relation to the connection member on the mounting plate, and/or it may be arranged as a part of the suction hose. The semipermeable material is arranged such that polymer is prevented from leaking past the semipermeable material. Semipermeable material may alternatively or additionally be inserted between the suction hose and the mounting plate as part of the step of attaching the suction hose to the connection member. In such embodiments, the semipermeable material may be easily replaced, for instance in case it ruptures.

LIST OF REFERENCE NUMERALS 2 wind turbine
4 tower
6 nacelle
8 hub
10 blade
11 blade shell
14 blade tip
16 blade root
20 mould
21 frame
22 mould surface
24 fibre mat
32 mounting plate opening detail area
33 root end detail area
68 outer fibre layer(s)
70 mounting plate
71 recesses for fastening members
72 hole
73 protrusions/pins/rods
74 bushings/fastening means
75 central hole with inner thread
76 insert/butterfly wedge
77 first side of mounting plate
78 stay bolt
79 second side of mounting plate
80 air-tight cover member
81 recesses for holding a mounting plate
95 inner fibre layer(s)
100 root end assembly
101 mounting plate opening
102 semipermeable material/patch
103 tacky tape
104 air-tight material
105 suction hose

The invention claimed is:

1. A method for manufacturing a wind turbine blade shell part (11) made of a composite structure comprising a fibre-reinforcement material embedded in a polymer matrix via vacuum assisted resin transfer moulding, the method comprising the steps of:

mounting a plurality of fastening devices (74) on a first side (77) of a mounting plate (70) so as to form a root end assembly, the mounting plate comprising one or more first openings (101) for evacuating air, the mounting plate having a second side (79) opposite the first side (77);

arranging the root end assembly, one or more outer fibre layers (68) defining an outer surface of the wind turbine blade shell part, and one or more inner fibre layers (95) on a mould surface (22) of a mould (20) such that the fastening devices are arranged above a root end section of the mould and are embedded between the one or more outer fibre layers and the one or more inner fibre layers;

arranging an air-tight cover member (80) so as to form a mould cavity defined by the air-tight cover member, the mould surface, and the mounting plate, with the one or more outer fibre layers, the one or more inner fibre layers, and the fastening devices arranged within the mould cavity;

evacuating air from the mould cavity via at least the one or more first openings of the mounting plate; and supplying a polymer into the mould cavity and allowing the polymer to cure so as to form the composite structure.

2. The method for manufacturing in accordance with claim 1, wherein arranging the root end assembly, the one or more outer fibre layers, and the one or more inner fibre layers comprises:

arranging the one or more outer fibre layers on the mould surface arranging the root end assembly such that the fastening devices are arranged above the one or more outer fibre layers at the root end section of the mould;

arranging the one or more inner fibre layers on top of the fastening devices subsequent to arranging the root end assembly such that the fastening devices are arranged above the one or more outer fibre layers at the root end section of the mould.

3. The method for manufacturing in accordance with claim 1, further comprising:

removing the mounting plate after the curing.

4. The method for manufacturing in accordance with claim 1, further comprising:

blocking at least one of the one or more first openings with a semipermeable material (102), the semipermeable material being permeable for air and nonpermeable for the polymer, whereby the polymer is prevented from leaking through the at least one first opening.

5. The method for manufacturing in accordance with claim 4, wherein blocking the at least one first opening comprises attaching the semipermeable material over the first opening at least on the first side (77) of the mounting plate.

6. The method for manufacturing in accordance with claim 4, wherein blocking the at least one first opening comprises attaching the semipermeable material over the at least one first opening on the second side (79) of the mounting plate.

7. The method for manufacturing in accordance with claim 4, wherein blocking the at least one first opening comprises attaching the semipermeable material to the mounting plate using a tacky material and/or a glue.

8. The method for manufacturing in accordance with claim 1, further comprising ceasing suction at a particular opening of the one or more first openings in the mounting plate if the particular opening becomes blocked by polymer from the mould cavity.

9. The method for manufacturing in accordance with claim 8, wherein ceasing suction at the particular opening comprises switching off suction means providing suction at the particular opening.

10. The method for manufacturing in accordance with claim 1, further comprising sealing at least one of the one or more first openings with a flexible air-tight material (102) on the second side of the mounting plate and providing suction through an opening in the air-tight material.

11. The method for manufacturing in accordance with claim 10, wherein the opening in the air-tight material is offset from the at least one first opening sealed with flexible air-tight material, whereby when the at least one first opening is blocked by polymer supplied into the mould cavity, the flexible air-tight material sealably collapses onto the mounting plate, preventing further suction through the at least one first opening.

12. The method for manufacturing in accordance with claim 10, wherein the air-tight material is one or more vacuum bags.

13. The method for manufacturing in accordance with claim 1, wherein a suction hose is releasably attached to the mounting plate, such as by threading means or by quick connector means, in fluid communication with at least one of the one or more first openings, and the method further comprises providing suction through the suction hose.

14. The method for manufacturing in accordance with claim 13, wherein a semipermeable material being permeable for air and nonpermeable for the polymer is arranged in the mounting plate and/or in the suction hose so as to prevent the polymer from leaking past the semipermeable material.

15. A root end assembly (100) for a wind turbine blade shell part (11), comprising:

a mounting plate (70) having a first side (77) and a second side (79); and a plurality of fastening members (74) mounted on the first side of the mounting plate, the mounting plate being adapted to be removed after the root end assembly has been mounted in the wind turbine blade shell part, wherein the mounting plate further comprises one or more first openings (101) blocked with a semipermeable material (102) that is permeable for air and nonpermeable for a fibre-reinforcement polymer, whereby the polymer is prevented from passing through the one or more first openings.

* * * * *